United States Patent
Kasada et al.

(10) Patent No.: US 7,354,694 B1
(45) Date of Patent: Apr. 8, 2008

(54) STYRYL DYE

(75) Inventors: Chiaki Kasada, Okayama (JP); Toshio Kawata, Okayama (JP); Kentaro Yano, Okayama (JP); Shigeo Yasui, Okayama (JP)

(73) Assignee: Kabushiki Kaisha Hayashibara Seibutsu Kagaku Kenkyuko, Okayama (JP)

( * ) Notice: Subject to any disclaimer, the term of this patent is extended or adjusted under 35 U.S.C. 154(b) by 395 days.

(21) Appl. No.: 09/890,711

(22) PCT Filed: Nov. 24, 2000

(86) PCT No.: PCT/JP00/08298

§ 371 (c)(1),
(2), (4) Date: Aug. 2, 2001

(87) PCT Pub. No.: WO01/40382

PCT Pub. Date: Jun. 7, 2001

(30) Foreign Application Priority Data

Dec. 2, 1999 (JP) .................................. 11-343211

(51) Int. Cl.
*G11B 7/24* (2006.01)
(52) U.S. Cl. .................... 430/270.18; 430/270.19; 430/945; 369/283; 428/64.8
(58) Field of Classification Search ............... 430/945, 430/279.18, 270.19; 428/64.8
See application file for complete search history.

(56) References Cited

U.S. PATENT DOCUMENTS

| | | | |
|---|---|---|---|
| 3,615,644 A * | 10/1971 | Gotze et al. ............... | 430/582 |
| 3,782,934 A | 1/1974 | Ohlschlager et al. | |
| 3,888,850 A | 6/1975 | Entschel et al. | |
| 3,933,505 A * | 1/1976 | Shiba et al. ................ | 430/570 |
| 3,945,832 A * | 3/1976 | Shiba et al. ................ | 430/547 |
| 3,996,215 A | 12/1976 | Kobayashi et al. | |
| 4,090,031 A * | 5/1978 | Russell ...................... | 369/284 |
| 4,147,862 A * | 4/1979 | Hayami et al. ............. | 544/89 |
| 4,307,182 A | 12/1981 | Dalzell et al. | |
| 4,412,231 A * | 10/1983 | Namba et al. ........... | 346/135.1 |
| 4,626,496 A * | 12/1986 | Sato ..................... | 430/270.19 |
| 5,166,046 A * | 11/1992 | Okusa et al. ............... | 430/572 |
| 5,219,707 A * | 6/1993 | Namba .................. | 430/270.19 |

(Continued)

FOREIGN PATENT DOCUMENTS

EP          0068876    *    1/1983

(Continued)

OTHER PUBLICATIONS

Vansant et al., "Azastilbenes.. 1 Syntheses, Characterization and Structure", J.Org. Chem., vol. 45(9) pp. 1557-1565 (1980).*

(Continued)

*Primary Examiner*—Martin Angebranndt
(74) *Attorney, Agent, or Firm*—Browdy and Neimark

(57) ABSTRACT

The present invention provides styryl dyes which have absorption maxima at a wavelength of 400 nm or less and are sensitive to a laser beam with a wavelength of 450 nm or less, light absorbents and optical recording media which comprise the styryl dyes, and a process for producing the styryl dyes which comprises reacting with an aldehyde compound a quaternary ammonium salt of nitrogen atom containing heterocyclic compound having an active methyl or active methylene group.

3 Claims, 2 Drawing Sheets

U.S. PATENT DOCUMENTS

| | | | | |
|---|---|---|---|---|
| 5,246,758 | A | * | 9/1993 | Matsui et al. .............. 428/64.6 |
| 5,318,882 | A | * | 6/1994 | Ootaguro et al. ...... 430/270.19 |
| 5,569,587 | A | | 10/1996 | Waggoner |
| 6,383,722 | B1 | * | 5/2002 | Shinkai et al. .............. 430/321 |
| 6,582,881 | B1 | * | 6/2003 | Chapman et al. ...... 430/270.19 |

FOREIGN PATENT DOCUMENTS

| | | | |
|---|---|---|---|
| EP | 0224261 | * | 6/1987 |
| EP | 0246885 | | 11/1987 |
| EP | 1130063 | | 9/2001 |
| GB | 1335575 | | 10/1973 |
| GB | 1372622 | | 11/1974 |
| GB | 2004380 | | 3/1979 |
| GB | 2149930 | * | 6/1995 |
| GB | 2329751 | * | 3/1999 |
| JP | 51-018530 | * | 2/1976 |
| JP | 56-015485 | * | 2/1981 |
| JP | 60-083892 | * | 5/1985 |
| JP | 60-232995 | * | 11/1985 |
| JP | 61-137774 | * | 6/1986 |
| JP | 62-164591 | * | 7/1987 |
| JP | 63-054377 | * | 3/1988 |
| JP | 01-018441 | * | 1/1989 |
| JP | 01-19355 A2 | | 1/1989 |
| JP | 03-256790 | * | 11/1991 |
| JP | 05-038878 | * | 2/1993 |
| JP | 05-139043 A2 | | 6/1993 |
| JP | 06-134291 | * | 5/1994 |
| JP | 06-300913 | * | 10/1994 |
| JP | 07-043854 | * | 2/1995 |
| JP | 08-179467 | * | 7/1996 |
| JP | 63-256945 | * | 10/1996 |
| JP | 09-066671 | * | 3/1997 |
| JP | 09-323478 A2 | | 12/1997 |
| JP | 10-6651/98 A2 | | 1/1998 |
| JP | 10-151854 | * | 6/1998 |
| JP | 10-182997 | * | 7/1998 |
| JP | 10-188338 | * | 7/1998 |
| JP | 63-288785 | * | 11/1998 |
| JP | 10-324065 | * | 12/1998 |
| JP | 11-034489 | * | 2/1999 |
| JP | 11-138992 | * | 5/1999 |
| JP | 11-144313 | * | 5/1999 |
| JP | 11-314460 | * | 11/1999 |
| WO | WO 00/75111 A1 | | 12/2000 |

OTHER PUBLICATIONS

Faller, et al., "Some merocyanines with chelating properties", J. Org. Chem., vol. 29 pp. 3450-3452. (Nov. 1964).*

Colour Index, Third Ed (1972) pp. 4438.*

Machine translation of JP 11-314460.*

Machine translation of JP 08-179467.*

Abstract of JP 1103449; Applicant Nippon Kanko Shikiso Kenkyusho:KK; published Feb. 9, 1999.

Abstract of JP 11138992; Applicant Matsushita Electric Ind Co. Ltd.; published May 25, 1999.

Abstract of JP 11144313; Applicant Kao Corp.; published May 28, 1999.

Abstract of J 61258867; Applicant Nippon Kanko Shikiso Kenkyusho:KK published Nov. 17, 1986.

Abstract of JP 62193887; Applicant Olympus Optical Co. Ltd.; published Aug. 26, 1987.

Abstract of JP 081799467; Applicant Konica Corp; published Jul. 12, 1996.

Abstract of JP 62187088; Applicant Olympus Optical Co Ltd; published Aug. 15, 1987.

Abstract of JP 63256945; Applicant Mitsubishi Paper Mills Ltd; published Oct. 24, 1988.

* cited by examiner

STYRYL DYE

REFERENCE TO RELATED APPLICATIONS

The present application is the national stage under 35 U.S.C. 371 of international application PCT/JP00/08298, filed Nov. 24, 2000 which designated the United States, and which international application was not published under PCT Article 21(2) in the English language.

FIELD OF THE INVENTION

The present invention relates to organic dye compounds, and more particularly, to styryl dyes which have absorption maxima at a wavelength of 400 nm or less.

BACKGROUND OF THE INVENTION

In a multimedia age, optical recording media such as CD-R (a write-once memory using compact disc) and DVD-R (a write-once memory using digital video disc) are now of great importance. Most of the conventional optical recording media can be roughly classified into inorganic optical recording media which have recording layers composed of inorganic substances such as tellurium, selenium, rhodium, carbon, or carbon sulfide; and organic optical recording media which have recording layers mainly composed of light absorbents containing organic dye compounds.

Among these optical recording media, organic optical recording media can be usually prepared by dissolving a polymethine dye in an organic solvent such as 2,2,3,3-tetrafluoro-1-propanol (abbreviated as "TFP" hereinafter), spin coating the solution onto the surface of a polycarbonate substrate, drying the solution to form a recording layer, and sequentially forming and coating onto the surface of the recording layer a reflection layer comprising a metal such as gold, silver or copper, and a protection layer comprising an ultraviolet ray hardening resin. When compared with inorganic optical recording media, organic ones may have the drawback that their recording layers are susceptible to change under environmental lights such as reading and natural light. Organic optical recording media, however, have the advantage that they can be made into optical recording media at a lesser cost because their recording layers can be directly formed by coating light absorbents in solution on the surface of substrates. Further, organic optical recording media composed of organic materials are now mainly used as low-cost optical recording media because they are substantially free of corrosion even when contacted by moisture or sea water and because information recorded therein in a prescribed format can be read out by using commercially available read-only readers after establishing thermal-deformation-type optical recording media, a kind of organic optical recording media.

What is urgently required in organic optical recording media is to increase their storage capacity to suit to this multimedia age. The research for such an increment, which is now being eagerly continued in this field, is to increase the recording capacity per one side from 4.7 GB (giga bite) to 15 GB or more by shortening the wavelength for writing information to 450 nm or less from the wavelengths of 635-650 nm which are commonly used. The high-density optical recording media have the capacity to record movie and animations for six hours in picture quality of standard television or for two hours even in relatively-high picture quality of high definition television. However, since most organic dye compounds now used in the conventional optical recording media cannot be used with visible light with a wavelength of 450 nm or less, they could not fulfil the need for high-storage density required in many fields.

In view of the foregoing, the object of the present invention is to provide organic dye compounds which have absorption maxima at a wavelength of 400 nm or less and substantially absorb a visible light with a wavelength of 450 nm or less when formed in a thin layer, and to provide uses thereof.

SUMMARY OF THE INVENTION

The present inventors eagerly studied and screened compounds. As a result, they found that specific styryl dyes (may be called "styryl dyes" hereinafter), which are obtainable through a step of reacting a quaternary ammonium salt of nitrogen heterocyclic compound having an active methyl- or active methylene-group with an aldehyde compound, have absorption maxima at a wavelength of 400 nm or less and substantially absorb visible light with a wavelength around 400 nm. The present inventors confirmed that the styryl dyes, which substantially absorb visible light with a wavelength of 450 nm or less when formed in a thin layer, form remarkably minute pits at a relatively high density in optical recording media by irradiating with a laser beam with a wavelength of 450 nm or less. The present invention was made based on the creation of novel styryl dyes and the discovery of their industrially useful characteristics.

DETAILED DESCRIPTION OF THE INVENTION

Figure 1:
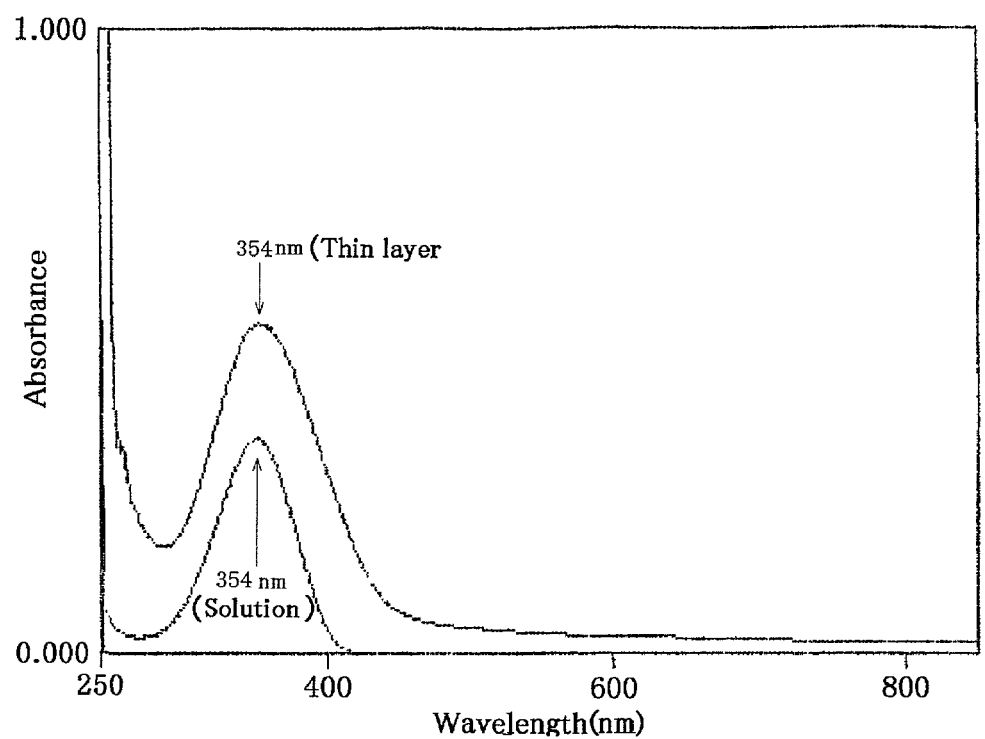
FIG. 1 is the visible absorption spectra of one of the styryl dyes of the present invention when in a solution form and in a thin layer form, respectively.

The present invention relates to the styryl dyes represented by Formula 1.

Formula 1:

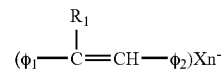

In Formula 1, $R_1$ represents a hydrogen atom, an aliphatic hydrocarbon group, ether group, acyl group, halogen, or cyano group. The aliphatic hydrocarbon group in $R_1$ represented that having up to six carbon atoms, usually, from one to five carbon atoms such as methyl, ethyl, propyl, isopropyl, butyl, isobutyl, sec-butyl, tert-butyl, pentyl, isopentyl, neopentyl, or tert-pentyl group. Examples of the ether groups are methoxy, ethoxy, propoxy, isopropoxy, butoxy, tert-butoxy, pentoxy, and phenoxy groups. Examples of the acyl groups are formyl, acetyl, propionyl, butyryl, tert-butyryl, benzoyl, o-tolyl, m-tolyl, and p-tolyl groups. Examples of the halogens are fluorine, chlorine, bromine, and iodine. One or more of the hydrogens in the aliphatic hydrocarbon group, ether group, and acyl group may be replaced with a short-chain aliphatic hydrocarbon group such as methyl, ethyl, or propyl group; a short-chain ether group such as methoxy, ethoxy, or propoxy group; or a halogen such as fluorine, chlorine, bromine, or iodine.

In Formula 1, $\phi_1$ represents a heterocycle which is represented by any one of Formulae 2 to 8.

Formula 2:

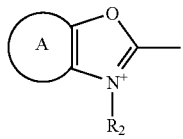

Formula 3:

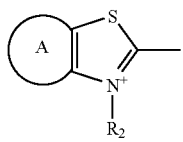

Formula 4:

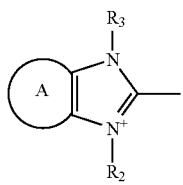

Formula 5:

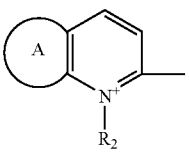

Formula 6:

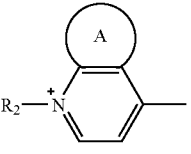

Formula 7:

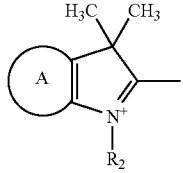

Formula 8:

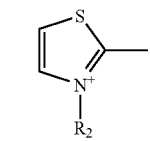

Throughout Formulae 2 to 7, A represents a monocyclic or polycyclic-aromatic-ring or heterocycle. Examples of the aromatic ring are benzene and naphthalene rings. Examples of the heterocycle are pyridine, quinoline, and quinoxaline rings. The aromatic ring and heterocycle may have one or more substituents, for example, a halogen atom such as fluorine, chlorine, bromine, or iodine atom; a short-chain aliphatic hydrocarbon group such as methyl, trifluoromethyl, ethyl, propyl, isopropyl, butyl, isobutyl, sec-butyl, or tert-butyl group; a short-chain ether group such as methoxy, trifluoromethoxy, ethoxy, propoxy, isopropoxy, butoxy, or tert-butoxy group; an alkylaminosulfonyl group such as methylaminosulfonyl, dimethylaminosulfonyl, ethylaminosulfonyl, diethylaminosulfonyl, propylaminosulfonyl, dipropylaminosulfonyl, butylaminosulfonyl, or dibutylaminosulfonyl group; an aromatic hydrocarbon group such as phenyl, biphenylyl, o-tolyl, m-tolyl, p-tolyl, xylyl, mesityl, o-cumenyl, m-cumenyl, p-cumenyl, or naphthyl group; an ester group such as methoxycarbonyl, trifluoromethoxycarbonyl, ethoxycarbonyl, propoxycarbonyl, acetoxy, trifluoroacetoxy, or benzoyloxy group; nitro group, cyano group, carboxy group, or sulfo group. When A is not present in Formulae 2 to 7, one or more substituents similar to those that are bound to A may be in the position where A is located.

Throughout Formulae 2 to 8, $R_2$ represents an aliphatic hydrocarbon group selected from those having up to eight carbon atoms, usually, up to six carbon atoms such as methyl, ethyl, propyl, isopropyl, isopropenyl, 1-propenyl, 2-propenyl, 2-propynyl, butyl, isobutyl, sec-butyl, tert-butyl, 2-butenyl, 2-butynyl, 1,3-butadienyl, pentyl, isopentyl, neopentyl, 1-methylpentyl, 2-methylpentyl, 2-pentenyl, 2-pentynyl, 2-penten-4-ynyl, hexyl, or isohexyl group. The aliphatic hydrocarbon group may have one or more substituents, for example, a halogen such as fluorine, chlorine, bromine, or iodine; an ether group such as methoxy, trifluoromethoxy, ethoxy, propoxy, isopropoxy, butoxy, tert-butoxy, benzyloxy, or phenoxy group; an ester group such as methoxycarbonyl, trifluoromethoxycarbonyl, ethoxycarbonyl, propoxycarbonyl, acetoxy, trifluoroacetoxy, or benzoyloxy group; a carboxy group; a sulfo group; a hydroxy group; an amido group such as acetylamino or benzoylamino group; an aromatic hydrocarbon group such as phenyl, biphenylyl, o-tolyl, m-tolyl, p-tolyl, xylyl, mesityl, o-cumenyl, m-cumenyl, p-cumenyl, or naphthyl group; or heterocyclic group such as 2-pyridyl, 2-quinolyl, 2-tetrahydropyranyl, 2,2-dimethyl-1,3-dioxolane-4-yl, 1,3-dioxolane-2-yl, 3,5-dimethylisooxazole-4-yl, 3-piperidinyl, piperidino, morpholino, 1-piperazinyl, pyrrolidine-1-yl, 1-methyl-2-pyrrolidinyl, 2-benzoimidazolyl, 5-uracil, or benzotriazole-1-yl group.

In Formula 4, $R_3$ represents a hydrogen atom or an aliphatic hydrocarbon group which is identical to or different from $R_2$. Representative examples of the aliphatic hydrocarbon group are short-chain groups such as methyl, ethyl, propyl, isopropyl, butyl, isobutyl, sec-butyl, or tert-butyl group, which may have one or more substituents, for example, an ether group such as methoxy, trifluoromethoxy, ethoxy, propoxy, isopropoxy, butoxy, or tert-butoxy group; an ester group such as methoxycarbonyl, trifluoromethoxycarbonyl, ethoxycarbonyl, propoxycarbonyl, acetoxy, trifluoroacetoxy, or benzoyloxy group; or an aromatic hydrocarbon group such as phenyl, o-tolyl, m-tolyl, p-tolyl, xylyl, mesityl, o-cumenyl, m-cumenyl, p-cumenyl, or nitrophenyl group.

Furthermore, in Formula 1, $\phi_2$ represents a monocyclic- or polycyclic-aromatic ring or heterocycle which may include one or more nitrogen atoms into the ring, for example, benzene, pyridine, pyrimidine, pyridazine, naphthalene, quinoline, or quinoxaline ring. The aromatic ring and heterocycle may have one or more substituents. The substituents are selected from those having up to eight carbon atoms, usually, one to six carbon atoms, for example, an aliphatic hydrocarbon group such as methyl, ethyl, propyl, isopropyl, butyl, isobutyl, sec-butyl, tert-butyl, pentyl, isopentyl, neopentyl, tert-pentyl, 1-methylpentyl, 2-methylpentyl, hexyl, or isohexyl group; a short-chain ether group such as methoxy, trifluoromethoxy, ethoxy, propoxy, isopropoxy, buthoxy, or tert-buthoxy group; an amido group such as acetylamino or benzoylamino group; a halogen such as fluorine, chlorine, bromine, or iodine; and cyano group, nitro group, hydroxy group, sulfo group, or carboxy group. When $\phi_2$ is a nitrogen-atom-containing heterocycle, the nitrogen atom may combine with the similar aliphatic hydrocarbon group as in $R_2$ in $\phi_1$ to form an ammonium salt. When $\phi_2$ has two hydroxy groups as a substituent and the hydroxy groups combine with adjacent carbon atoms in $\phi_2$, the hydroxy groups may react with an oxo compound such as formalin to form a cyclic structure such as a dioxole ring.

$X^-$ in Formula 1 represents an arbitrary counter ion and is usually selected from inorganic acid ions such as fluoride, chloride, bromide, iodide, perchloric acid, periodic acid, phosphoric acid hexafluoride, antimony hexafluoride, tin acid hexafluoride, phosphoric acid, fluoroboric acid, and tetrafluoroboric acid ions; organic acid ions such as thiocyanic acid, benzensulfonic acid, naphthalenesulfonic acid, naphthalenedisulfonic acid, p-toluenesulfonic acid, alkylsulfonic acid, benzenecarboxylic acid, alkylcarboxylic acid, trihaloalkylcarboxylic acid, alkylsulfonic acid, trihaloalkylsulfonic acid, nicotinic acid, and tetracyanoquinonedimethane ions; and organic metal complex ions such as azo, bisphenyldithiol, thiocatechol chelate, thiobisphenolate chelate, and bisdiol-α-diketone. "n" is the number of $X^-$ to balance the electric charge in the styryl dyes, and is usually an integer selected from one and two.

The present invention relates to styryl dyes having the structures as mentioned above, particularly, to those which have absorption maxima at a wavelength of 400 nm or less, and desirably those which substantially absorb a visible light with a wavelength of 450 nm or less when formed in a thin layer. Concrete examples of the styryl dyes are those represented by Chemical Formulae 1 to 60. Since all of them have absorption maxima at a wavelength of 400 nm or less and substantially absorb a visible light with a wavelength around 400 nm, they have diversified uses in the fields which need organic compounds that absorb the aforesaid visible light. Among the styryl dyes, those, which substantially absorb a visible light with a wavelength of 450 nm or less when formed in a thin layer, particularly, absorb the visible light in the absorption end of longer wavelength region of the absorption maximum, are remarkably useful as a material for producing a recording layer of high density optical recording media such as DVD-Rs for the coming generation.

Chemical Formula 1:

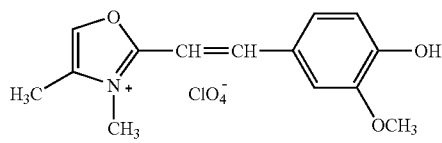

Chemical Formula 2:

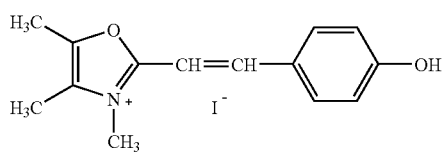

Chemical Formula 3:

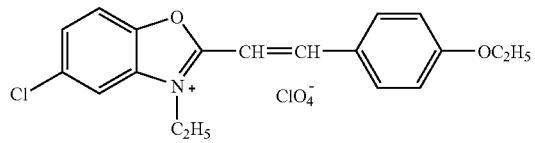

Chemical Formula 4:

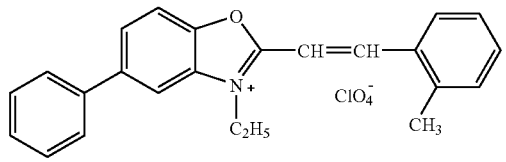

Chemical Formula 5:

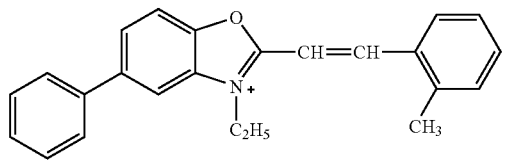

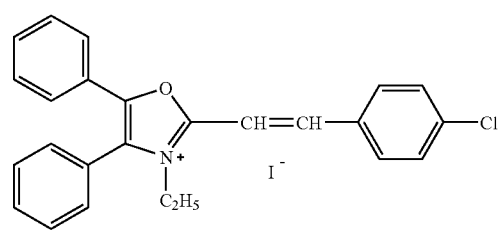

Chemical Formula 6:

Chemical Formula 7:

Chemical Formula 8:

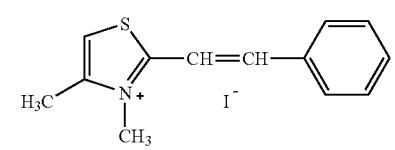

-continued
Chemical Formula 9:
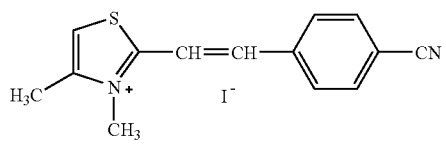
Chemical Formula 10:
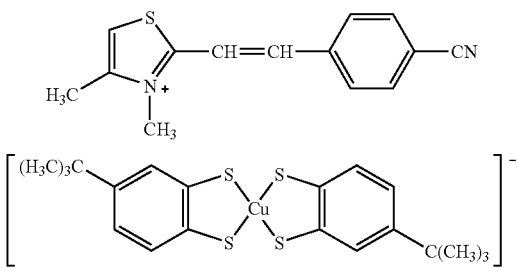
Chemical Formula 11:
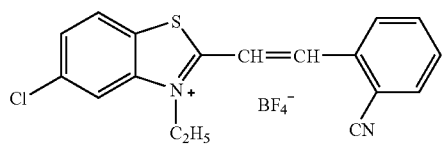
Chemical Formula 12:
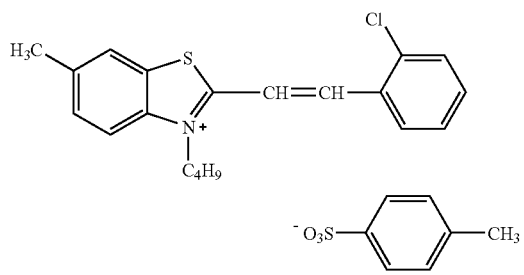
Chemical Formula 13:
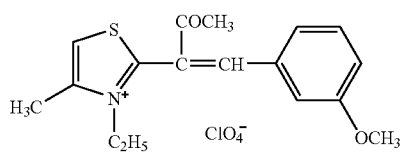
Chemical Formula 14:
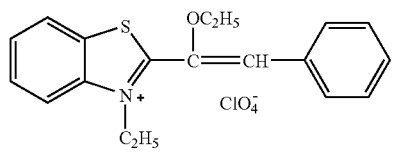
Chemical Formula 15:
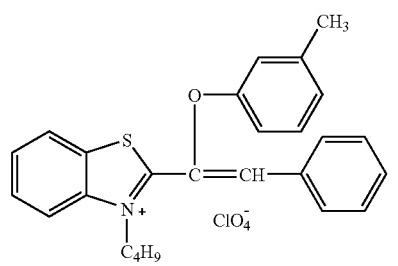
-continued
Chemical Formula 16:
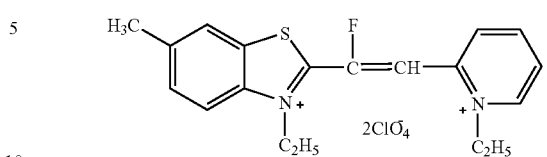
Chemical Formula 17:
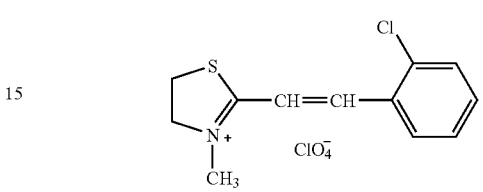
Chemical Formula 18:
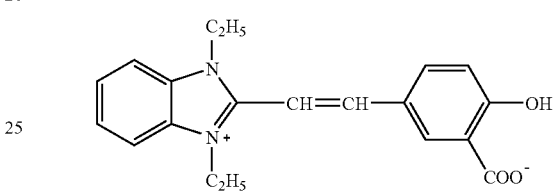
Chemical Formula 19:
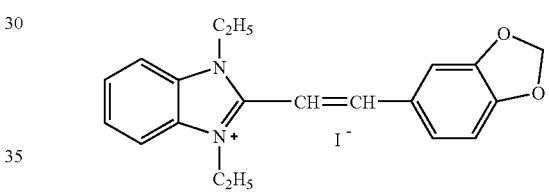
Chemical Formula 20:
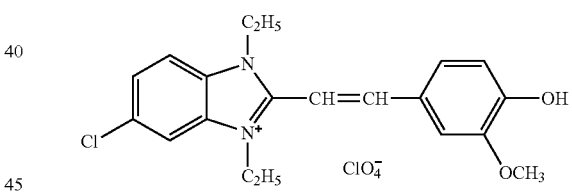
Chemical Formula 21:
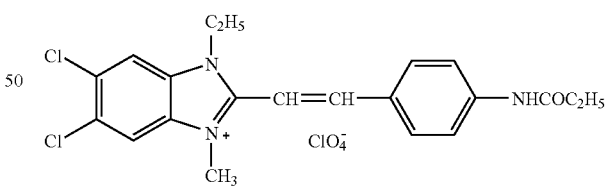
Chemical Formula 22:
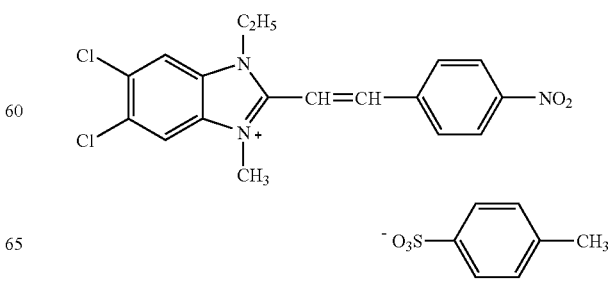

-continued
Chemical Formula 23:
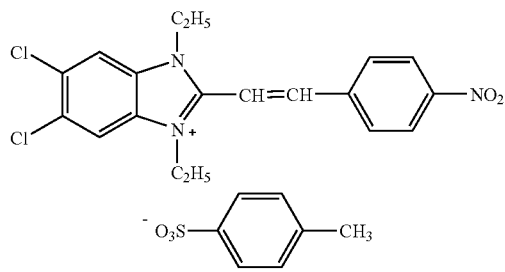
Chemical Formula 24:
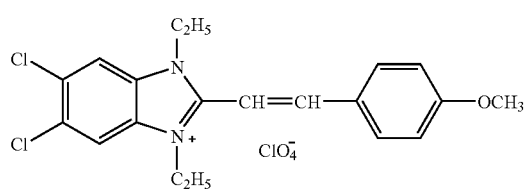
Chemical Formula 25:
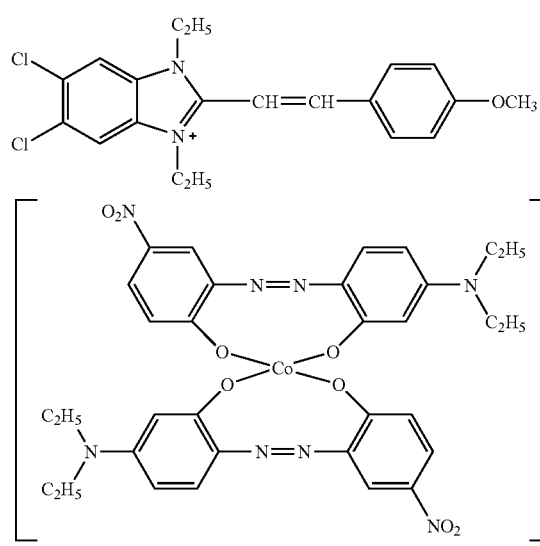
Chemical Formula 26:
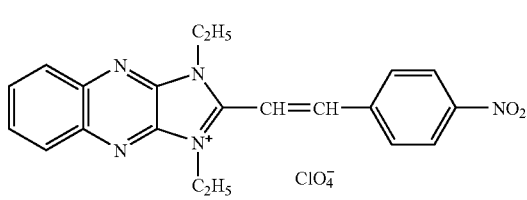
Chemical Formula 27:
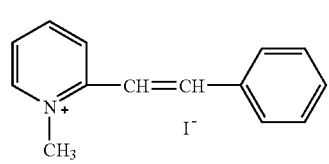
Chemical Formula 28:
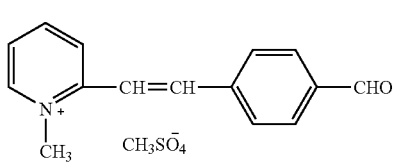
-continued
Chemical Formula 29:
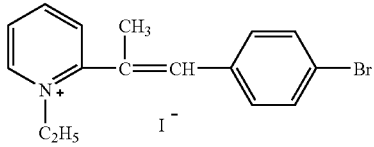
Chemical Formula 30:
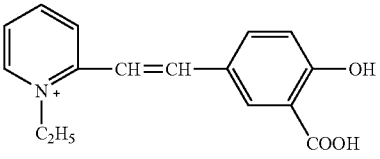
Chemical Formula 31:
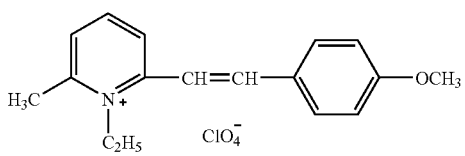
Chemical Formula 32:
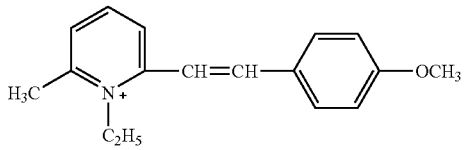
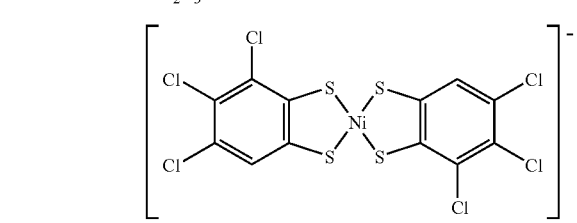
Chemical Formula 33:
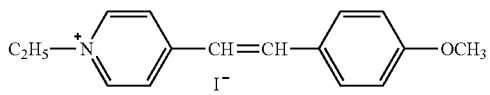
Chemical Formula 34:
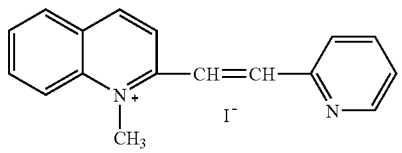
Chemical Formula 35:
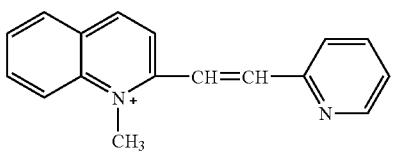

-continued
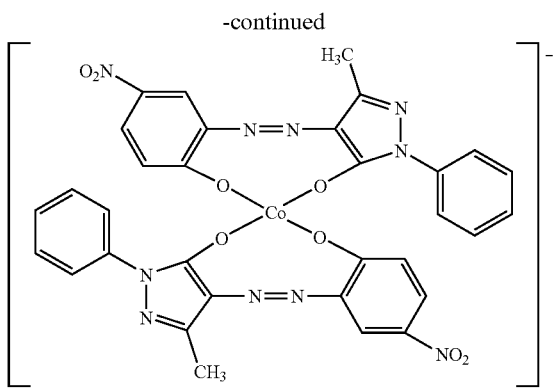
Chemical Formula 36:
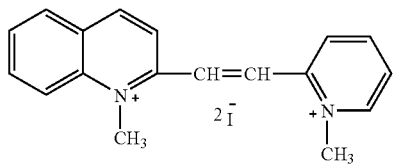
Chemical Formula 37:
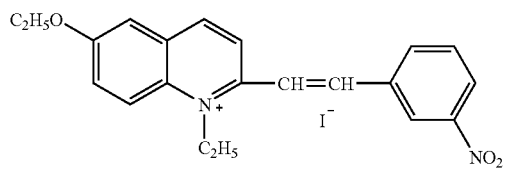
Chemical Formula 38:
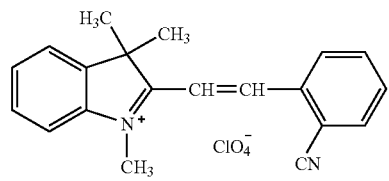
Chemical Formula 39:
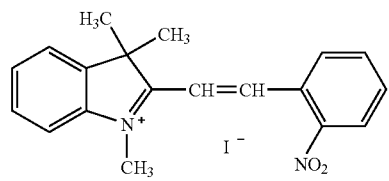
Chemical Formula 40:
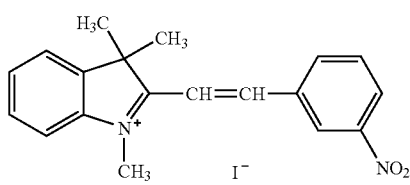
Chemical Formula 41:
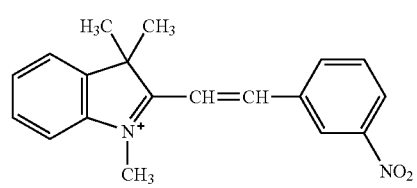
-continued
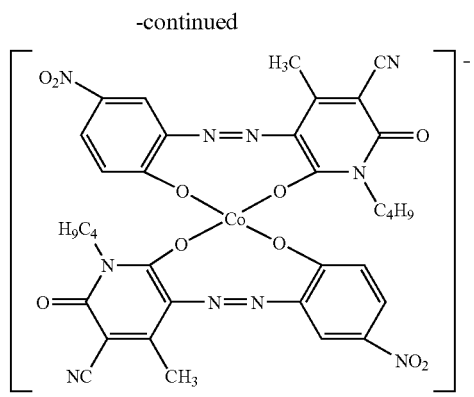
Chemical Formula 42:
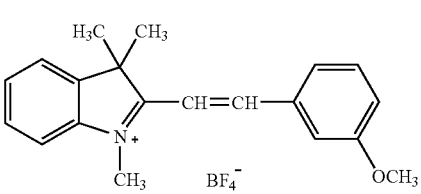
Chemical Formula 43:
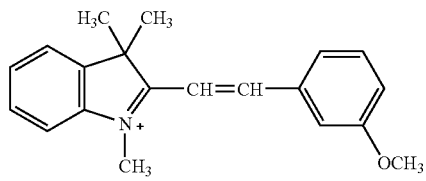
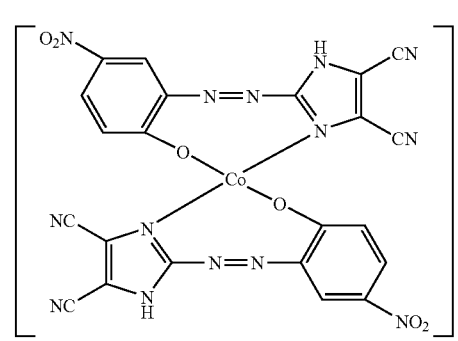
Chemical Formula 44:
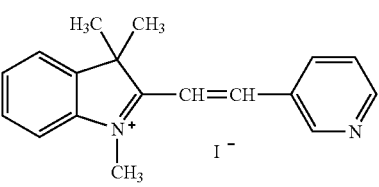
Chemical Formula 45:
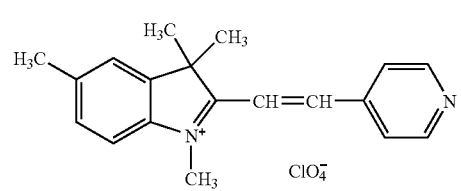

-continued
Chemical Formula 46:
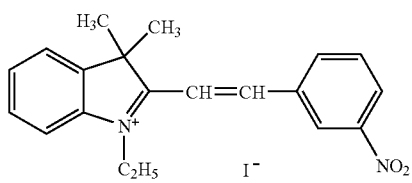
Chemical Formula 47:
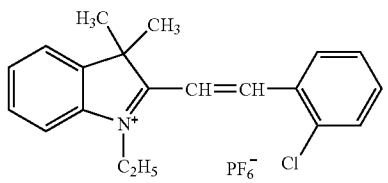
Chemical Formula 48:
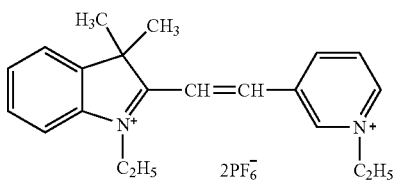
Chemical Formula 49:
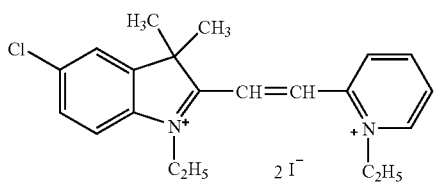
Chemical Formula 50:
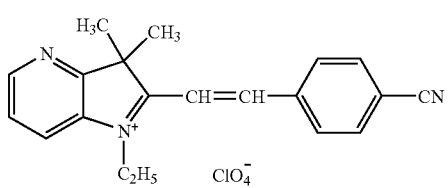
Chemical Formula 51:
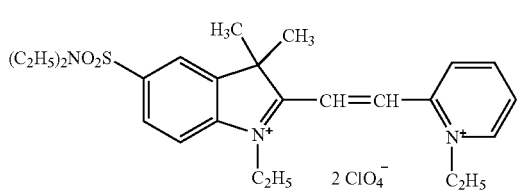
Chemical Formula 52:
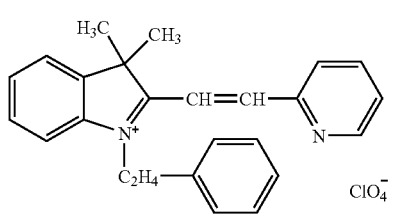
-continued
Chemical Formula 53:
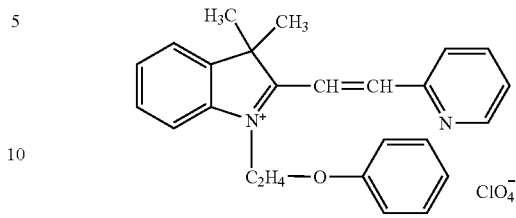
Chemical Formula 54:
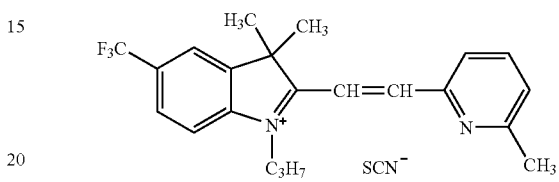
Chemical Formula 55:
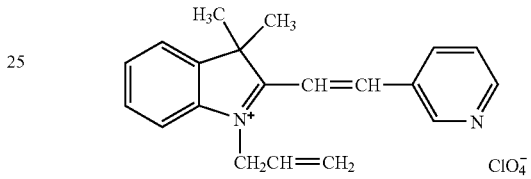
Chemical Formula 56:
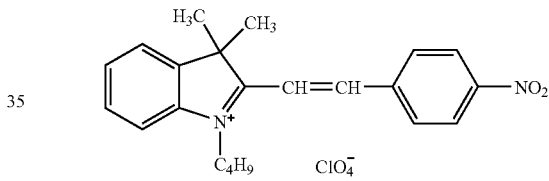
Chemical Formula 57:
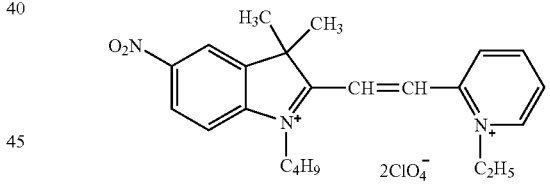
Chemical Formula 58:
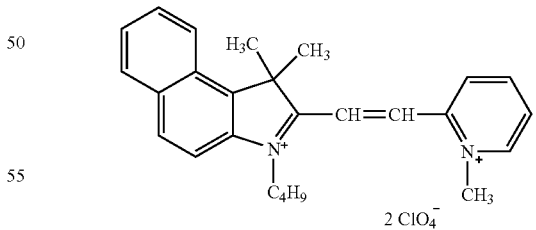
Chemical Formula 59:
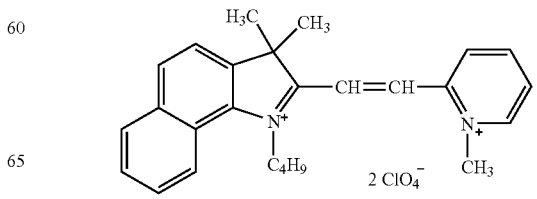

-continued

Chemical Formula 60:

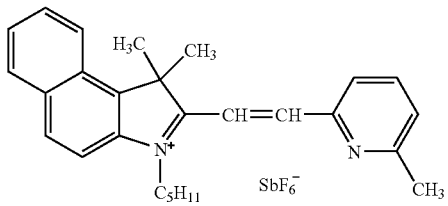

The styryl dyes of the present invention can be prepared by various procedures. They can be preferably and economically produced by a step of reacting a quaternary ammonium salt of nitrogen atom containing heterocyclic compound having either an active methyl- or active methylene-group with an aldehyde compound. With this method, the styryl dyes of the present invention can be produced in a desired yield by reacting a compound represented by Formula 9 having $\phi_1$ and $R_1$ corresponding to those in Formula 1 with a compound represented by Formula 10 having $\phi_2$ corresponding to those in Formula 1.

Formula 9:

Formula 10:

For example, appropriate amounts (usually about equal mols) of compounds represented by Formulae 9 and 10 are placed in a reaction vessel, and the resulting mixture is dissolved in an adequate solvent, if necessary, and then reacted at ambient temperature of over the temperature or under heating and stirring conditions, for example, a reflux in the presence of an appropriate amount of a basic compound such as sodium hydroxide, potassium hydroxide, sodium carbonate, potassium carbonate, sodium hydrogencarbonate, potassium hydrogencarbonate, ammonia, triethylamine, piperidine, pyridine, pyrrolidine, aniline, N,N-dimethylaniline, N,N-diethylaniline, or N-methyl-2-pyrrolidone; an acidic compound such as hydrochloric acid, sulfuric acid, nitric acid, methanesulforic acid, p-toluenesulfonic acid, acetic acid, acetic anhydride, propionic anhydride, trifluoroacetic acid, or trifluorosulfonic acid; or a Lewis acidic compound such as aluminium chloride, zinc chloride, tin tetrachloride, or titanium tetrachloride.

As to solvents which can be used in the present invention, for example, hydrocarbons such as pentane, hexane, cyclohexane, octane, benzene, toluene, and xylene; halides such as carbon tetrachloride, chloroform, 1,2-dichloroethane, 1,2-dibromoethane, trichloroethylene, tetrachloroethylene, chlorobenzene, bromobenzene, and ■-dichlorobenzene; alcohols and phenols such as methanol, ethanol, 1-propanol, 2-propanol, 1-butanol, 2-butanol, isobutyl alcohol, isopentyl alcohol, cyclohexanol, ethylene glycol, propylene glycol, 2-methoxyethanol, 2-ethoxyethanol, phenol, benzyl alcohol, cresol, diethylene glycol, triethylene glycol, and glycerin; ethers such as diethyl ether, diisopropyl ether, tetrahydrofuran, tetrahydropyran, 1,4-dioxane, anisole, 1,2-dimethoxyethane, diethylene glycol dimethyl ether, dicyclohexyl-18-crown-6, methylcarbitol, and ethylcarbitol; ketones such as furfural, acetone, ethyl methyl ketone, and cyclohexanone; acids and acidic derivatives such as acetic acid, acetic anhydride, trichloroacetic acid, trifluoroacetic acid, propionic anhydride, ethyl acetate, butyl carbonate, ethylene carbonate, propylene carbonate, formamide, N-methylformamide, N,N-dimethylformamide, N-methylacetoamide, N,N-dimethylacetoamide, hexamethylphosphoric triamide, and trimethyl phosphate; nitriles such as acetonitrile, propionitrile, succinonitrile, and benzonitrile; nitro compounds such as nitromethane and nitrobenzene; sulfur-containing compounds such as dimethylsulfoxide and sulfolane; and water can be used and arbitrarily used in a combination, if necessary.

In general, when solvents are used, the greater the volume of solvents the lower the reaction efficiency. On the contrary, the lower the volume of solvents the more difficult homogeneous heating and stirring of the contents becomes and undesirable side reactions may easily occur. Thus, the volume of solvents is desirably set to a level up to 100-folds, usually, in the range of 5-50-folds to the total volume of material compounds by weight. The reaction is complete within 10 hours, usually, 0.5-10 hours, depending on the kinds of reactants and the reaction conditions. The reaction progress can be monitored by conventional methods, for example, thin layer chromatography, gas chromatography, and high-performance liquid chromatography. After completion of the reaction, the styryl dyes of the present invention with desired counter ions are obtainable by subjecting the reaction mixture to a conventional counter ion-exchange reaction, if necessary. Thus, all of the styryl dyes represented by Chemical Formulae 1 to 60 are obtainable in a desired yield by the above method. Compounds represented by Formulae 9 and 10 are obtainable in accordance with conventional methods to form a cyclic nucleus in the styryl dyes.

The styryl dyes thus obtained can be used in the form of a reaction mixture without any further treatment, but are usually used after being purified by conventional techniques which are generally used for purifying their related compounds, such as dissolution, extraction, separation, decantation, filtration, concentration, thin layer chromatography, column chromatography, gas chromatography, high-performance liquid chromatography, distillation, crystallization, and sublimation. If necessary, these methods can be used in combination. When the styryl dyes of the present invention are used in dye lasers and optical recording media such as DVD-Rs, it is preferable that the styryl dyes of the present invention be distilled, crystallized, and/or sublimated prior to use.

The light absorbents of the present invention comprise one or more of the styryl dyes and include those which utilize the nature of the styryl dyes which substantially absorb visible light with a wavelength around 400 nm. The compositions or the physical forms of the light absorbents are not restricted. Therefore, the light absorbents of the present invention may comprise one or more other compounds in addition to the styryl dyes, depending on use. One of the fields in which the light absorbents of the present invention can be advantageously used is optical recording media. In this field, the light absorbents of the present invention are suitable as a material for producing recording layers of optical recording media using a laser beam with a wavelength of 450 nm or less as a writing light. In using the light absorbents of the present invention in optical recording media, unless the use deviates from the object of the present invention, the styryl dyes can be mixed with other light absorbents comprising other organic dye compounds which are sensitive to visible light and one or more conventional materials used in optical recording media, such as a light-resistant improver, binder, dispersing agent, flame retardant, lubricant, antistatic agent, surfactant, thermal interference inhibitor, plasticizer, color fixing agent, developer, and dissolving assistant, if necessary.

Explaining the uses of the light absorbents of the present invention by examplifying organic optical recording media (organic heat-deformative-type optical recording media), the optical recording media of the present invention can be prepared in accordance with conventional organic recording media because the styryl dyes of the present invention require no special treatment beyond the treatments which are commonly used in this art. For example, one or more of the styryl dyes of the present invention can be mixed with one or more other organic dye compounds which are sensitive to visible light, and one or more conventional light-resistant improvers, binders, dispersing agents, flame retardants, lubricants, antistatic agents, surfactants, thermal interference inhibitors, and plasticizers to control the reflection rate and the light absorption rate in a recording layer, if necessary. The resulting mixture is dissolved in an organic solvent, and the solution is uniformly coated over either surface of the substrates by means of spraying, soaking, roller coating, or rotatory coating methods; and dried to form a recording layer, a thin layer comprising light absorbents, and if necessary, followed by forming a reflection layer to be closely attached onto the recording layer by the method of vacuum deposition, chemical vapor deposition, sputtering, or ion plating using metals such as gold, silver, copper, platinum, aluminium, cobalt, tin, nickel, iron, and chromium or using conventional organic materials for reflection layers to impart a reflection efficiency with which the written information can be read, for example, 20% or more, and preferably 30% or more. The ultraviolet-ray-hardening resins or thermosetting resins, which contain flame retardants, stabilizers, and/or antistatic agents are spin coated over the recording layer, and then the coated resins are hardened by either irradiating light or heating to form a protection layer to be closely attached onto the reflection layer to protect the recording layer from scratches, dusts, spills, etc. Thereafter, if necessary, a pair of the above substrates with recording, reflection, and recording layers are faced and attached together using, for example, adhesives or viscous sheets; or protection plates, which are comprising the same materials and shapes as the substrates, are attached to the protection layers of the substrates.

As another organic dye compounds usable in combination with the styryl dyes of the present invention, dye compounds are particularly restricted as long as they are sensitive to visible light and can modulate the light reflection- and the light absorption-rates of recording layers of optical recording media. As the organic dye compounds, the following compounds can be used in an arbitrary combination, if necessary: Acridine dye, azaannulene dye, azo dye, azo metal complex dye, anthraquinone dye, indigo dye, indanthrene dye, oxazine dye, xanthene dye, dioxazine dye, thiazine dye, thioindigo dye, tetrapyrapolphyradine dye, triphenylmethine dye, triphenylthiazine dye, naphthoquinone dye, pyrromethene dye, phthalocyanine dye, benzoquinone dye, benzopyran dye, benzofuranone dye, polyphyrin dye, rhodamine dye, and polymethine dyes such as cyanine dye, merocyanine dye, oxonol dye, azulenium dye, squalilium dye, styryl dye, pyririum dye, thiopyririum dye, and phenanthrene dye in which the same or different rings are bound to both ends of polymethine chain such as monomethine, dimethine, trimethine, tetramethine, pentamethine, hexamethine, or heptamethine. The chain and rings can have one or more substituents. Examples of the ring are imidazoline ring, imidazole ring, banzoimidazole ring, α-naphthimidazole ring, β-naphthimidazole ring, indole ring, isoindole ring, indolenine ring, isoindolenine ring, benzoindolenine ring, pyridinoindolenine ring, oxazoline ring, oxazole ring, isooxazole ring, benzooxazole ring, pyridinooxazole ring, α-naphthoxazole ring, β-naphthoxazole ring, selenazoline ring, selenazole ring, benzoselenazole ring, α-naphthselenazole ring, β-naphthselenazole ring, thiazoline ring, thiazole ring, isothiazole ring, benzothiazole ring, α-naphththiazole ring, β-naphththiazole ring, tellurazoline ring, tellurazole ring, benzotellurazole ring, α-naphthtellurazole ring, β-naphthtellurazole ring, acridine ring, anthracene ring, isoquinoline ring, isopyrrole ring, imidanoxaline ring, indandione ring, indazole ring, indaline ring, oxadiazole ring, carbazole ring, xanthene ring, quinazoline ring, quinoxaline ring, quinoline ring, chroman ring, cyclohexanedione ring, cyclopentandione ring, cinnoline ring, thiodiazole ring, thiooxazolidone ring, thiophene ring, thionaphthene ring, thiobarbituric acid ring, thiohydantoin ring, tetrazole ring, triazine ring, naphthalene ring, naphthyridine ring, piperazine ring, pyrazine ring, pyrazole ring, pyrazoline ring, pyrazolidine ring, pyrazolone ring, pyran ring, pyridine ring, pyridazine ring, pyrimidine ring, pyrylium ring, pyrrolidine ring, pyrroline ring, pyrrole ring, phenazine ring, phenanthridine ring, phenanthrene ring, phenanthroline ring, phthalazine ring, pteridine ring, furazane ring, furan ring, purine ring, benzene ring, benzoxazine ring, benzopyran ring, morpholine ring, and rhodanine ring. As the organic dye compounds used in combination with the styryl dyes of the present invention, they desirably have an absorption maxima in the visible region, particularly, at wavelengths of 400-850 nm, when formed in a thin layer.

The light-resistant improvers are, for example, nitroso compounds such as nitrosodiphenylamine, nitrosoaniline, nitrosophenol, and nitrosonaphthol; and metal complexes such as dithiolate metal complexes, for example, "NKX-1199" (bis[2'-chloro-3-methoxy-4-(2-methoxyethoxy) dithiobenzyl]nickel) produced by Hayashibara Biochemical Laboratories, Inc., Okayama, Japan, and formazane metal complexes, which all can be arbitrarily used in combination, if necessary. Preferable light-resistance improvers are those which contain metal complexes, and the most preferable ones are metal complexes, more preferably, formazane compounds which have a pyridine-ring at C-5 and a pyridine or furan ring at C-3 of formazane skeleton as disclosed in Japanese Patent Application No. 163,036/99, titled "Formazane metal complexes", and complexes with metals such as nickel, zinc, cobalt, iron, copper, and palladium, which have the tautomer of the aforesaid compounds as a ligand. In the case of using such a light-resistance improver in combination, the styryl dyes of the present invention can be effectively prevented from undesirable deterioration, fading, color changing, and quality changing, which are inducible by environmental lights such reading- and natural-lights, without lowering the solubility of the light absorbents of the present invention in organic solvents and substantially deteriorating preferable optical features. As to a composition ratio, 0.01-5 moles of a light-resistance improver(s), desirably, 0.1-1 moles, can be incorporated into one mole of the styryl dye(s) while increasing or decreasing the ratio. The light-resistant improver(s) are not necessarily other compound(s) which exist separately from the styryl dyes of the present invention, and if necessary, they can be formulated into salts, complexes, or compounds by combining the styryl dyes with organic metal complex anions, which are capable of improving the light resistance as disclosed in Japanese Patent Kokai Nos. 19,355/89, 139,043/93, 323,478/97, and 6,651/98. These include conventional compounds such as azo, bisphenyldithiol, phenyldithiol, thiocatecholchelate, thiobisphenolatechelate, or bisdithiol-α-diketone by using appropriate spacers and crosslinking agents such as alkoxides or cyanates of titanium, zirconium, aluminium, etc., or complexes of these metal elements having carbonyl compounds or hydroxy compounds as ligands.

The styryl dyes of the present invention have satisfactorily-high solubility in organic solvents without substantially causing undesirable problems in actual use, and do not particularly restrict the types of organic solvents used for coating the light absorbents of the present invention over substrates. Thus, in the preparation of optical recording media according to the present invention, arbitrary organic solvents can be selected from the following conventional ones which are arbitrarily used in combination, if necessary: TFP frequently used to prepare optical recording media and the following organic solvents other than TFP: For example, hydrocarbons such as benzene, toluene, and xylene; halides such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, propanol, isopropanol, 2,2,2-trifluoroethanol, butanol, isobutanol, isopentanol, cyclohexanol, ethylene glycol, propylene glycol, 2-methoxyethanol (methyl cellosolve), 2-ethoxyethanol (ethyl cellosolve), phenol, benzyl alcohol, cresol, diethylene glycol, triethylene glycol, glycerine, and diacetone alcohol; ethers such as diethyl ether, diisopropyl ether, tetrahydrofuran, tetrahydropyran, 1,4-dioxane, anisole, 1,2-dimethoxyethane, dicyclohexyl-18-crown-6, methylcarbitol, and ethylcarbitol; ketones such as furfural, acetone, 1,3-diacetylacetone, ethyl methyl ketone, and cyclohexanone; esters such as ethyl acetate, butyl acetate, ethylene carbonate, propylene carbonate, and trimethyl phosphate; amides such as formamide, N-methylformamide, N,N-dimethylformamide, and hexamethylphosphoric triamide; nitriles such as acetonitrile, propionitrile, and succinonitrile; nitro compounds such as nitromethane and nitrobenzene; amines such as ethylene diamine, pyridine, piperidine, morpholine, and N-methylpyrrolidone; and sulfur-containing compounds such as dimethylsulfoxide and sulfolane.

Particularly, since the styryl dyes of the present invention have relatively high solubilities in easily volatile organic solvents such as TFP, methyl cellosolve, ethyl cellosolve, and diacetone alcohol, they are substantially free from dye crystallization when they are sequentially dissolved in the organic solvents, coated on substrates, and dried and do not cause inconsistent thickness and surface of the formed recording layers. Most of the styryl dyes of the present invention exert desirable solubilities in non-halogen solvents, for example, cellosolves such as methyl cellosolve and ethyl cellosolve, alcohols such as diacetone alcohol, and ketones such as ethyl methyl ketone and cyclohexanone. When the styryl dyes of the present invention dissolve in the non-halogen solvents and the obtained solutions are coated over the plastic substrates, the solvents neither damage the substrates nor pollute the environment, which is an advantage.

Conventional substrates can be used in the present invention and are usually processed with suitable materials, for example, into discs, 12 cm in diameter and 0.1-1.2 mm in thickness, to be conformed to final use by methods such as compression molding, injection molding, compression-injection molding, photopolymerization method (2P method), thermosetting integral method, and lightsetting integral method. These discs can be used singularly or plurally after they have been appropriately attached together with adhesive sheets or adhesive agents, etc. In principal, any materials for substrates can be used in the present invention as long as they are substantially transparent and have light transmissivity of at least 80%, and preferably 90% or more at wavelengths ranging from 350 nm to 800 nm. Examples of such materials are glasses, ceramics, and others such as plastics including polyacrylate, polymethyl methacrylate, polycarbonate, polystyrene (styrene copolymer), polymethylpentene, polyester, polyolefin, polyimide, polyetherimide, polysulfone, polyethersulfone, polyarylate, polycarbonate/polystyrene alloy, polyestercarbonate, polyphthalatecarbonate, polycarbonateacrylate, non-crystalline polyolefin, methacrylate copolymer, diallylcarbonatediethylene-glycol, epoxy resin, and phenol resin, where polycarbonate and acrylate are most frequently used. In plastic substrates, concaves for expression of synchronizing signals and addresses of tracks and sectors are usually transferred to the internal circle of the tracks during their formation. The present invention does not restrict the form of concaves and the concaves are preferably formed to give 0.3-0.8 nm in average width and 50-150 nm in depth.

The styryl dyes of the present invention can be prepared into 0.5-5% (w/w) solutions of the organic solvents as mentioned above while considering the viscosity of the solutions, and then uniformly coated over a substrate to form a recording layer of 10-1,000 nm, preferably, 50-300 nm in thickness. Prior to the coating, a preliminary layer can be formed over the substrate to improve the protection and the adhesion ability of the substrate, if necessary. Materials of the preliminary layer are, for example, high-molecular substances such as ionomer resins, polyamide resins, vinyl resins, natural resins, silicon, and liquid rubbers. In the case of using binders, the following polymers can be used alone or in combination in a weight ratio of 0.01-10 times of the light absorbent(s): Cellulose esters such as nitrocellulose, cellulose phosphate, cellulose sulfate, cellulose acetate, cellulose propionate, cellulose lactate, cellulose palmitate, and cellulose acetate/propionate; cellulose ethers such as methyl cellulose, ethyl cellulose, propyl cellulose, and butyl cellulose; vinyl resins such as polystyrene, poly(vinyl chloride), poly(vinyl acetate), poly(vinyl acetal), poly(vinyl butyral), poly(vinyl formal), poly(vinyl alcohol), and poly(vinyl pyrrolidone); copolymer resins such as styrene-butadiene copolymers, styrene-acrylonitrile copolymers, styrene-butadiene-acrylonitrile copolymers, vinyl chloride-vinyl acetate copolymers, and maleic anhydride copolymers; acrylic resins such as poly(methyl methacrylate), poly(methyl acrylate), polyacrylate, polymethacrylate, polyacrylamide, and polyacrylonitrile; polyesters such as poly(ethylene terephthalate); and polyolefins such as polyethylene, chlorinated polyethylene, and polypropylene.

Explaining the manner for using the optical recording media according to the present invention, the high-density optical recording media of the present invention such as DVD-Rs can write informations at a relatively high density by using a laser beam with a wavelength of 450 nm or less, more particularly, a laser beam with a wavelength around 350-450 nm irradiated by semiconductor laser elements such as InN, GaN, InGaN, InAlGaN, InGaNAs, BInN, InGaNP, InP, GaP, GaAsP, and SiC, which oscillate in the blue color or violet color region; or a distributed feedback-type laser, which oscillates in the red color region, and to which is set a second harmonics generating mechanism to a semiconductor element of AlGaAs. To read recorded information, laser beams are used with wavelengths identical to or slightly longer or shorter than those used for writing information. As for the laser power for writing and reading information, in the optical recording media of the present invention, it is preferably set to a relatively high level, which exceeds the threshold of the energy required for forming pits in writing information. It is preferably set to a relatively low level, i.e., a level of below the threshold when used in reading recorded informations, although the power levels can be varied depending on the types and ratios of the light-resistant improvers used in combination with the light absorbents of the present invention and further the writing speed. Generally, the levels can be controlled to outputs of over 5 mW for writing, usually in the range of 10-50 mW, and to outputs of 5 mW or lower for reading, usually in the range of 0.1-5 mW. The recorded information is read by detecting the changes of both the reflection light level and the transmission light level in the pits and the pit-less part on the surface of optical recording media by the light pick-up manner.

Accordingly, in the optical recording media of the present invention, remarkably minute pits with a pit width of below 0.4 nm/pit and a track pitch of below 0.74 um used in the conventional DVD-R, can be formed at a relatively high density by using a laser beam with an oscillating wavelength of 450 nm. For example, in using a substrate, 12 cm in diameter, it can realize an extremely high density optical recording medium with an optical recording capacity far exceeding 4.7 GB (giga bytes) per one side, i.e., that of about two hours of information of sound and images in relatively high image quality of high definition television which could hardly be attained in the commonly used DVD-Rs.

Since the optical recording media of the present invention can record information including characters, images, and sound at a relatively high density, they are advantageously useful as recording media for professional and family uses to record and care for documents, data, and computer software. Particular examples of the types of industries and the forms of information to which the optical recording media can be applied are drawings of construction and engineering works, maps, ledgers of roads and rivers, aperture cards, architectural sketches, documents of disaster protection, wiring diagrams, arrangement plans, information from newspapers and magazines, local information, and construction specifications, which all relate to construction and engineering works; blueprints, ingredient tables, prescriptions, product specifications, product price tables, parts lists, information for maintenance, case study files of accidents and problems, manuals for claims, production schemes, technical documents, sketches, details, company's house-made product files, technical reports, and analysis reports, which are all used in production; customers information, information of business connections, information of companies, contracts, information of newspapers and magazines, business reports, company's credit research, and stock lists, which are all used in sales; information of companies, records of stock prices, statistical documents, information from newspapers and magazines, contracts, customer lists, documents of application/notification/licenses/authorization, and business reports, which are all used in finance; information regarding real property and transportation, sketches of construction, maps, local information, information from newspapers and magazines, contracts for lease, information about companies, stock lists, traffic information, and information regarding business connections, which are all used in real property and transportation; diagrams of writings and pipe arrangements for electric and gas supplies, documents of disaster protection, tables of operation manuals, documents of investigations, and technical reports; medical charts, files of clinical histories and case studies, and diagrams for medical care/institution relationships; texts, collections of questions, educational documents, and statistical information; scientific papers, records in academic societies, monthly reports of research, research data, documentary records and indexes thereof, which are all used in universities, colleges, and research institutes; inspection data, literatures, patent publications, weather maps, analytical records of data, and customer files, which are all used for information; case studies on laws; membership lists, history notes, records of works/products, competition data, and data of meetings/congresses, which are all used in several organizations/associations; sightseeing information, traffic information, and local information, which are all used for sightseeing; indexes of homemade publications, information from newspapers and magazines, who's who files, sport records, telop files, and scripts, which are all used in mass communication and publishing; and maps, ledgers of roads and rivers, fingerprint files, resident cards, documents of application/notification/license/authorization, statistical documents, and public documents, which are all used in government offices. Particularly, the write-once type optical recording media of the present invention can be advantageously useful for storing records of charts and official documents which should never be falsified and deleted, and used as electronic libraries for art galleries, libraries, museums, broadcasting stations, etc.

As a rather specific use, the optical recording media of the present invention can be used to edit and proofread compact discs, digital video discs, laser discs, MD (a mini disc as an information recording system using photomagnetic disc), CDV (a laser disc using compact disc), DAT (an information recording system using magnetic tape), CD-ROM (a read-only memory using compact disc), DVD-ROM (a read-only memory using digital video disc), DVD-RAM (a writable and readable memory using digital video disc), digital photos, movies, computer graphics, publishing products, broadcasting programs, commercial messages, computer programs, video software, audio software, game software, etc.; and used as external program recording means for large computers and car navigation systems.

Hereinbefore, the use of the light absorbents of the present invention in the field of optical recording media has been mainly limited to high-density optical recording media which use a laser beam with a wavelength of 450 nm or less as a writing light. However, in the field of optical recording media, the light absorbents of the present invention can be also advantageously used as materials for changing or regulating the optical absorption rate or the optical reflection rate in the existing optical recording media such as CD-Rs, DVD-Rs, and other high-density optical recording media by using in combination, for example, with one or more other organic dye compounds which are sensitive to a laser beam with a wavelength around 635-650 nm or 775-795 nm. When applied to organic-ablation type optical recording media using a laser beam with a wavelength of 450 nm or less as a writing light, the styryl dyes of the present invention can be used not to directly form pits on substrates but to indirectly form pits in such a manner that the excitation energy of a laser beam with a wavelength of 450 nm or less is allowed to transfer to the aforesaid organic dye compounds via the styryl dyes by using the styryl dyes along with one or more other organic dye compounds which are sensitive to a laser beam with a longer wavelength, e.g., a laser beam with a wavelength around 635-650 nm or 775-795 nm, resulting in a decomposition of the organic dye compounds. The optical recording media as referred to in the present invention mean optical recording media in general which use the characteristics of the specific styryl dyes of the present invention that have an absorption maxima at a wavelength of 400 nm or less and substantially absorb visible light with a wavelength around 400 nm in addition to organic thermal-deformed optical recording media, thermal coloration method using the chemical reaction of coloring agents and developers using the heat generated when organic dye compounds absorb light, and the technique called "moth-eye type technique" which uses the phenomenon that the above heat smooths the pattern of periodical unevenness provided on the surface of the substrates.

Since the styryl dyes of the present invention have absorption maxima at a wavelength of 400 nm or less and substantially absorb visible light with a wavelength around 400 nm, the light absorbents of the present invention containing the styryl dyes can be advantageously useful in the aforesaid optical recording media and also used as materials for polymerizing polymerizable compounds by exposure to visible light, sensitizing solar batteries, light absorptive materials for lithography, materials for laser active substances in dye lasers which oscillate in the blue color or violet region, and for dying clothes in combination with one or more other organic dye compounds which substantially absorb visible light. If necessary, in combination with one or more other light absorbents capable of absorbing light in the ultraviolet, visible and/or infrared regions, the light absorbents can be used in clothes in general and others including building/bedding/decorating products such as drapes, lace, casements, prints, casement cloth, roll screens, shutters, shop curtains, blankets, thick bed quilts including comforters, peripheral materials for the thick bed quilts, cover for the thick bed quilts, cotton for the thick bed quilts, bed sheets, cushions, pillows, pillow covers, cushions, mats, carpets, sleeping bags, tents, interior finish for cars, and window glasses including car window glass; sanitary and health goods such as paper diapers, diaper-covers, eyeglasses, monocles, and lorgnettes; internal base sheets, linings, and materials for shoes; wrappers; materials for umbrellas; parasols; stuffed toys; lighting devices; filters, panels and screens for information displaying devices such as televisions and personal computers which use cathode-ray tubes, liquid crystal displays, electroluminescent displays, and plasma displays; sunglasses; sunroofs; sun visors; pet bottles; refrigerators; vinyl houses; lawns; optical fibers; prepaid cards; and windows of ovens including electric ovens. When used as wrapping materials, injection materials, and vessels for the above products, the light absorbents of the present invention prevent living bodies and products from problems and discomforts induced by environmental light such as natural and artificial light or even minimize the above them. Furthermore, they can advantageously regulate the color, tint, and appearance and control the light reflected by or passed through the products to a desirable color balance.

The following examples describe the preferred embodiments of the present invention:

EXAMPLE 1

Styryl Dye

Twenty milliliters (ml) of acetic anhydride and 0.6 ml of triethylamine were placed in a reaction vessel, and mixed with 4 g of 2,3,4-trimethylthiazolium=iodide and 2 g of 4-cyanobenzaldehyde. The resulting mixture was reacted at 80□ C for one hour under stirring conditions, and then was cooled down. The crystals formed were collected, washed with ethanol, dissolved in a solution of methanol and chloroform under heating, and then filtered. The obtained filtrate was distilled to remove chloroform and cooled down to obtain 1.1 g of a yellow crystal of the styryl dye represented by Chemical Formula 9. When measured in a conventional manner, the melting point of the crystal was 261-263□ C.

The styryl dye of this Example with remarkable optical properties has various uses in many fields including those of optical recording media as a light absorbent.

EXAMPLE 2

Styryl Dye

Forty milliliters of ethanol and 2 ml of triethylamine were placed in a reaction vessel, and mixed with 6 g of 1,2,3,3-tetramethyl-3H-indolenium tosylate and 3 g of 3-nitrobenzaldehyde. The resulting mixture was reacted at 80□ C for one hour under stirring conditions, and then was cooled down. The crystals formed were collected, dissolved in a solution of methanol and chloroform under heating conditions, and then filtered. The obtained filtrate was distilled to remove chloroform and cooled to obtain 3.4 g of an orangish yellow crystal of the styryl dye represented by Chemical Formula 40. When measured in a conventional manner, the melting point of the crystal was 233□ C.

The styryl dye of this Example with remarkable optical properties has various uses in many fields including those of optical recording media as a light absorbent.

EXAMPLE 3

Styryl Dye

Twenty milliliters of ethanol and a very small amount of piperidine were placed in a reaction vessel, and mixed with 5 g of 1,2-dimethylquinolium=iodide and 2.2 g of 2-formylpyridine. The resulting mixture was reacted at 80° C. for 20 min under stirring conditions, and then was cooled down. The crystals formed were collected and recrystallized in ethanol to obtain 1.3 g of an orangish yellow crystal of the styryl dye represented by Chemical Formula 34. When measured in a conventional manner, the melting point of the crystal was 199-200° C.

The styryl dye of this Example with remarkable optical properties has various uses in many fields including those of optical recording media as a light absorbent.

EXAMPLE 4

Styryl Dye

Ten milliliters of dimethylformamide and 1 ml of iodomethyl were placed in a reaction vessel, and mixed with 1 g of the styryl dye obtained in Example 3. The resulting mixture was reacted at 100□ C for one hour under stirring conditions, and then was cooled. The crystals formed were collected and recrystallized in ethanol to obtain 0.8 g of an orangish red crystal of the styryl dye represented by Chemical Formula 36. When measured in a conventional manner, the melting point of the crystal was 222-223□ C.

EXAMPLE 5

Styryl Dye

Twelve milliliters of ethanol and 0.24 ml of piperidine were placed in a reaction vessel, and mixed with 3 g of 1,3-diethyl-2-methyl-5,6-dichlorobenzimidazolium tosylate and 1.1 g of 4-nitrobenzaldehyde. The resulting mixture was reacted at 80□ C for one hour under stirring conditions, and then was cooled. The crystals formed were collected, dissolved in a solution of methanol and water under heating conditions, and then filtered. The obtained filtrate was distilled to concentrate the solution to half volume and cooled to obtain 1.7 g of a yellow crystal of the styryl dye represented by Chemical Formula 23. When measured in a conventional manner, the melting point of the crystal was 287-290□ C.

The styryl dye of this Example with remarkable optical properties has various uses in many fields including those of optical recording media as a light absorbent.

Although the production conditions and yields are varied in some degrees depending on the structures of the styryl dyes of the present invention, all the styryl dyes of the present invention including the compounds represented by Chemical Formulae 1 to 60 can be produced in a satisfactory yield by the methods in Examples 1 to 5 or in accordance therewith.

EXAMPLE 6

Optical Property of Styryl Dye

EXAMPLE 6-1

Light Absorption Characteristics of Styryl Dye

Figure 2:
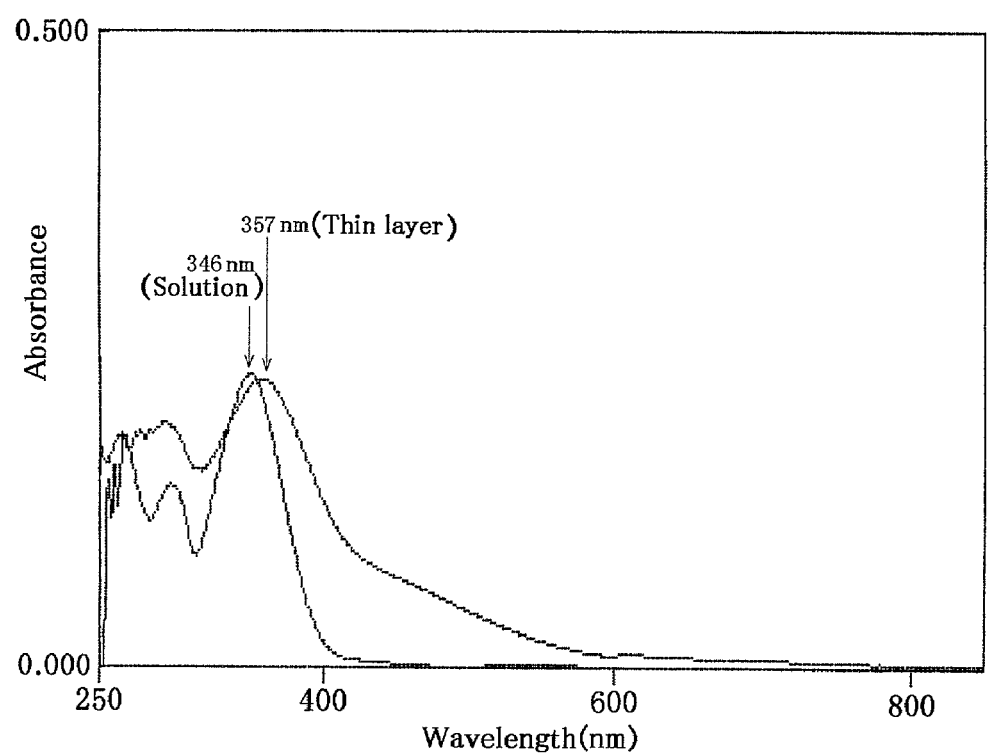
FIG. 2 is the visible absorption spectra of another styryl dye of the present invention when in a solution form and in a thin layer form, respectively.
Figure 3:
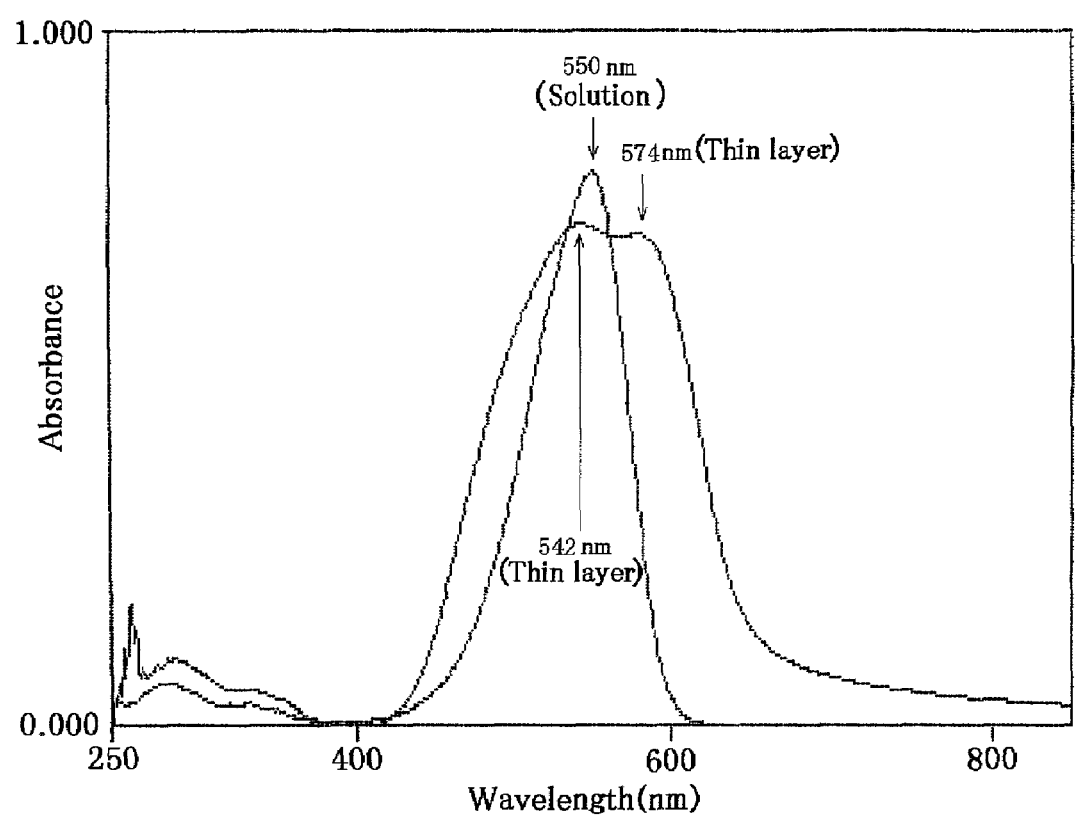
FIG. 3 is the visible absorption spectra of a conventional related compound when in a solution form and in a thin layer form, respectively.

The styryl dyes of the present invention represented by Chemical Formulae 8, 9, 19, 23, 34, 36, 38, 40, and 44 were measured for visible absorption spectra when dissolved in methanol and formed into thin layers over glasses. In parallel, the conventional related compound represented by Chemical Formula 61 was measured for visible absorption spectrum when formed in a solution and in a thin layer similarly as above. The results were tabulated in Table 1 and FIGS. 1 to 3 show visible absorption spectra of the styryl dye of the present invention represented by Chemical Formulae 8, 36, and 61 when formed in a solution and in a thin layer, respectively.

Chemical Formula 61:

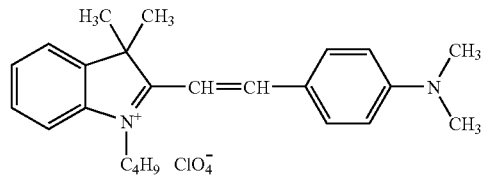

TABLE 1

| Styryl dye | Maximum absorption (nm) | | Remarks |
| --- | --- | --- | --- |
| | Solution | Thin layer | |
| Chemical Formula 8 | 354 | 354 | Present invention |
| Chemical Formula 9 | 350 | 368 | Present invention |
| Chemical Formula 19 | 359 | 366 | Present invention |
| Chemical Formula 23 | 334 | 346 | Present invention |
| Chemical Formula 34 | 364 | 376 | Present invention |
| Chemical Formula 36 | 346 | 357 | Present invention |
| Chemical Formula 38 | 375 | 430 | Present invention |
| Chemical Formula 40 | 371 | 383 | Present invention |
| Chemical Formula 44 | 372 | 405 | Present invention |
| Chemical Formula 61 | 550 | 542, 574 | Control |

As shown in the visible absorption spectra of FIG. 3, the conventional related compound represented by Chemical Formula 61 has absorption maxima at a wavelength longer than 400 nm when formed in a solution and in a thin layer. As shown in the results of FIGS. 1 and 2 and Table 1, most of the styryl dyes of the present invention have absorption maxima at a wavelength of 400 nm or less when formed in a solution and in a thin layer, and the absorption ends to the side of longer wavelength area extended to around 450 nm when formed in a thin layer. These results showed that the styryl dyes of the present invention were different from conventional related compounds and that they were sensitive to a laser beam with a wavelength of 450 nm or less, particularly, a laser beam with a wavelength around 350-450 nm, and substantially absorb such a laser beam.

EXAMPLE 6-2

Light-Resistance Improvement of Styryl Dye

Fifteen milligrams (mg) of either of the styryl dyes of the present invention represented by Chemical Formulae 9, 19, 23, 34, 36, 38, 40, and 44 was added to three milliliters (ml) of TFP. To the mixture was added 2 mg of nitrosodiphenylamine represented by Chemical Formula 62 which is used in conventional optical recording media as a light-resistant improver, followed by 5 min ultrasonic energization at ambient temperature to dissolve the contents in the solvent. Thereafter, in a conventional manner, a prescribed amount of the resulting solution was dropped on either surface of a polished glass substrate, 5 cm×5 cm, while the glass substrate was rotated at a rotation rate of 1,200 rpm for one minute to uniformly coat the solution thereupon, and sequentially blown with hot air and cold air to form a thin layer on the glass substrate.

Chemical Formula 62:

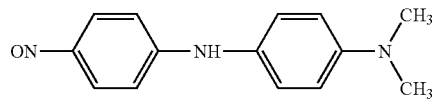

The resulting glass substrate coated with either of the styryl dyes was measured for transmittance ($T_0$) at a wavelength of 400 nm, and then set to the position seven cm away from a 500 W xenon lamp and exposed to the light of the lamp for 25 min while sending cold air to the substrate. Immediately after that, the resulting substrate was remeasured for transmittance (T) at a wavelength of 400 nm, and the transmittance of T and $T_0$ for each styryl dye was substituted for the Equation 1 to calculate the residual percentage (%) of the styryl dye. In parallel, control systems with no light-resistant improver for each styryl dye were provided.

$$\text{Residual percentage of styryl dye (\%)} = \frac{100 - T}{100 - T_0} \times 100 \quad \text{Equation 1}$$

TABLE 2

| Styryl dye | Residual percentage of styryl dye (%) | |
| --- | --- | --- |
| | With light-resistant improver | With no light-resistant improver |
| Chemical Formula 9 | 91.1 | 44.8 |
| Chemical Formula 19 | 76.0 | 45.9 |
| Chemical Formula 23 | 96.6 | 45.6 |
| Chemical Formula 34 | 90.0 | 86.1 |
| Chemical Formula 36 | 99.9 | 99.0 |
| Chemical Formula 38 | 93.4 | 30.0 |
| Chemical Formula 40 | 97.6 | 96.0 |
| Chemical Formula 44 | 87.1 | 61.0 |

As shown in the results of Table 2, in the system with no light-resistant improvers, maximum 70% of the styryl dyes had changed with only 25 min exposure of light to be incapable of exerting their inherent light absorbent properties. When used in combination with the nitroso compound represented by Chemical Formula 62, over 76% of the styryl dyes still remained intact without being changed by the exposure. These results indicate that light-resistant improvers are useful to suppress undesirable changes of the styryl dyes of the present invention by exposure to natural and artificial light.

EXAMPLE 7

Optical Recording Medium

Either of the styryl dyes of the present invention represented by Chemical Formulae 8, 9, 19, 23, 34, 36, 38, 40, and 44 as a light absorbent was admixed with TFP to give a concentration of 3.0% (w/w), and the mixture was further added the nitroso compound represented by Chemical Formula 62 to give a concentration of 0.35% (w/w), heated for a while, followed by ultrasonically dissolving the contents. The resulting solution was in a conventional manner filtered through a membrane, coated in a rotatory manner over one side of an acrylic disc substrate, 12 cm in diameter, to which had been transferred concaves for expressing synchronizing signals and addresses of tracks and sectors by an injection molding, to give a thickness of 200 nm. Thereafter, the substrate was spattered with silver to form a reflection layer, 100 nm in thickness, to be closely attached on the surface of the recording layer by vaporization, and the reflection layer was homogeneously coated in a rotatory manner with "DAI-CURE CLEAR SD1700", a known ultraviolet ray hardening resin commercialized by Dainippon Ink and Chemicals, Inc., Tokyo, Japan, and irradiated to form a protection layer to be closely attached on the surface of the reflection layer, followed by obtaining nine types of optical recording media.

All of the optical recording media of this Example can be used for writing large amounts of information in the form of documents, images, and sound at a relatively-high density by using a laser element with an oscillation wavelength of 450 nm or less.

As described above, the present invention was made based on the creation of novel styryl dyes and the findings of their industrially usable characteristics. Since the styryl dyes of the present invention have absorption maxima at a wavelength of 400 nm or less and substantially absorb visible light with a wavelength around 400 nm, they have diversified uses in the fields of optical recording media, photochemical polymerization, dye laser, solar batteries, lithography, dyeing, etc., which need organic compounds with such properties. Particularly, among the styryl dyes, they, being sensitive to a laser beam with a wavelength of 450 nm or less, are advantageously useful as a material for a recording layer of high-density optical recording media such as DVD-Rs.

As compared with the conventional DVD-Rs which use polymethine dyes as a light absorbent and write information by using a laser beam with a wavelength of 635 nm or 650 nm, the optical recording media of the present invention, which include the styryl dyes of the present invention and use a laser beam with a wavelength of 450 nm or less as a writing light, can form minute pits at a relatively narrower track pitch and a relatively high density. Accordingly, when used the optical recording media of the present invention, they can record a vast amount of information of characters, images, and sound at a relatively-high density, resulting in greatly lowering the cost of recording information per bit and recording animations for a long time, which need much recording volume, of course standing picture as a merit.

The useful styryl dyes can be easily prepared in a desirable amount by the process of the present invention which comprises a step of reacting a quaternary ammonium salt of nitrogen heterocyclic compound having an active methyl- or active methylene-group with an aldehyde compound.

The present invention having such outstanding effects and functions is a significant invention that will greatly contribute to this art.

We claim:

1. In an optical recording medium comprising an organic dye compound which has an absorption maximum at a wavelength of 400 nm or shorter, the improvement wherein the organic dye compound is a styryl dye represented by Formula 1 which substantially absorbs a visible light with a wavelength of around 400 nm, said optical recording medium being constructed so as to record information by using a laser beam with a wavelength of 450 nm or shorter, at a recording level of exceeding 4.7 GB (giga bytes) per one side by forming pits having a pit width of below 0.4 μm/pit and a track pitch of below 0.74 μm when formed into a disk, 12 cm in diameter:

Formula 1:

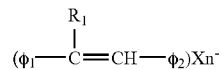

wherein in Formula 1, ø1 represents a heterocycle represented by any one of Formulae 2 to 8; ø2 represents an aromatic ring which has a substituent selected from the group consisting of halogen, cyano, nitro, and carboxy, or heterocycle having one or more nitrogen atoms; $R_1$ represents a hydrogen atom, an aliphatic hydrocarbon group, ether group, acyl group, halogen, or cyano group, and the aliphatic hydrocarbon group, ether group, or acyl group may have a substituent; X⁻ represents as a counter ion an azo organic metal complex ion; and "n" is a number of X⁻ to balance the electric charge in the styryl dye:

Formula 2:

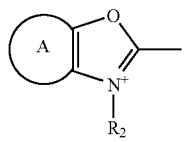

Formula 3:

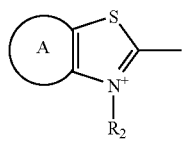

Formula 4:

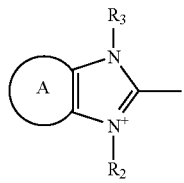

Formula 5:

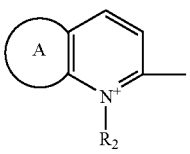

Formula 6:

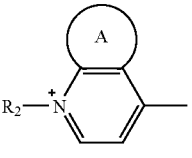

Formula 7:

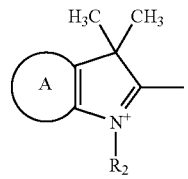

Formula 8:

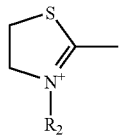

throughout Formulae 2 to 7, A represents an optionally substituted monocyclic- or polycyclic-aromatic ring or heterocycle; when A is not present in Formulae 2 to 7, one or more substituents similar to those that are bound to A may be in the position where A is located; throughout Formulae 2 to 8, $R_2$ represents an optionally substituted aliphatic hydrocarbon group and $R_3$ represents a hydrogen or an optionally substituted aliphatic hydrocarbon group which is identical to or different from $R_2$.

2. The optical recording medium of claim 1, which further contains one or more other organic dye compounds sensitive to a visible light.

3. The optical recording medium of claim 2, which further contains one or more appropriate light-resistant improvers in a recording layer.

* * * * *